(12) United States Patent
Iida et al.

(10) Patent No.: US 6,846,007 B2
(45) Date of Patent: Jan. 25, 2005

(54) AIRBAG COVER HAVING ORNAMENT

(75) Inventors: Hitoshi Iida, Aichi-ken (JP); Tadashi Yamamoto, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 10/430,285

(22) Filed: May 7, 2003

(65) Prior Publication Data

US 2003/0214120 A1 Nov. 20, 2003

(30) Foreign Application Priority Data

May 14, 2002 (JP) ........................................ 2002-138447

(51) Int. Cl.[7] .............................................. B60R 21/20
(52) U.S. Cl. ..................... 280/728.3; 280/731; 280/732; 428/31
(58) Field of Search .............................. 280/728.3, 731, 280/732; 428/31; 40/591, 593

(56) References Cited

U.S. PATENT DOCUMENTS

| | | | | |
|---|---|---|---|---|
| 5,294,147 A | * | 3/1994 | Edge ........................ | 280/728.3 |
| 5,678,851 A | * | 10/1997 | Saito et al. .............. | 280/728.3 |
| 5,685,056 A | * | 11/1997 | Fischer .................... | 280/728.3 |
| 5,851,022 A | * | 12/1998 | Yamamoto et al. ...... | 280/728.3 |
| 5,913,534 A | * | 6/1999 | Klingauf .................. | 280/728.3 |
| 6,003,895 A | * | 12/1999 | Niwa et al. .............. | 280/728.3 |
| 6,105,999 A | * | 8/2000 | Johnson ........................ | 280/727 |
| 6,149,186 A | * | 11/2000 | Manfrin .................... | 280/728.2 |
| 6,168,187 B1 | * | 1/2001 | Yamada et al. .......... | 280/728.3 |
| 6,176,516 B1 | * | 1/2001 | Bobler et al. ............ | 200/61.54 |
| 6,322,100 B1 | * | 11/2001 | Cuevas et al. ........... | 280/728.2 |
| 6,568,704 B2 | * | 5/2003 | Iida et al. ................ | 280/728.3 |

FOREIGN PATENT DOCUMENTS

| | | | | | |
|---|---|---|---|---|---|
| JP | 2000025547 | * | 1/2000 | .............. | 280/728.3 |
| JP | 2000118344 | * | 4/2000 | .............. | 280/728.3 |
| JP | 2000135955 | * | 5/2000 | .............. | 280/728.3 |
| JP | 2000246556 | * | 9/2000 | .............. | 280/728.3 |
| JP | 2000255362 | * | 9/2000 | .............. | 280/728.3 |
| JP | 2000272458 | * | 10/2000 | .............. | 280/728.3 |
| JP | 2001151063 | * | 6/2001 | .............. | 280/728.3 |
| JP | 2001-354098 | | 12/2001 | | |

* cited by examiner

*Primary Examiner*—Paul N. Dickson
*Assistant Examiner*—Toan C To
(74) *Attorney, Agent, or Firm*—Posz & Bethards, PLC

(57) ABSTRACT

In an airbag cover having an ornament, mounting legs of the ornament are inserted individually into mounting holes formed in a door portion of the airbag cover and are bent at first bent portions near the opening of the mounting holes on the rear side of the door. The leading end portions of the mounting legs are bent at second bent portions arranged near the leading ends of the mounting legs, on the rear side of the door. The portions of the mounting legs near their leading ends which are bent at the second bent portions are covered by melting and solidifying cover portions having compatibility with the material forming the airbag cover. The vicinities of the leading ends of the mounting leg portions are covered with the cover portions as to be restrained from being extracted in the general direction of the axis of the portion of the mounting leg between the first bent portion and the second bent portion.

8 Claims, 8 Drawing Sheets

AIRBAG COVER HAVING ORNAMENT

This application claims priority from Japanese patent application of Iida et al, filed May 14, 2002, No. 2002-138447, the complete disclosure of which is hereby incorporated into the present application by this reference.

BACKGROUND OF THE INVENTION

1. Field of the Invention

The present invention relates to an airbag cover for covering an airbag which has been folded and housed and, more particularly, to an airbag cover having an ornament. The airbag device having the airbag cover is mounted in the steering wheel, in front of the front seat passenger, the door, the seat or the like of an automobile.

2. Description of the Related Art

In the prior art, an airbag cover having an ornament is made to have a construction, as disclosed in JP-A-No. 2001-354098 (especially FIG. 3).

In the airbag cover disclosed therein, the ornament is provided with an ornamental portion arranged on the surface side of a door portion, and a plurality of mounting leg portions extended downward from the ornamental portion. This ornament is mounted on the door portion by inserting its mounting leg portions into mounting holes formed in the door portion and by bending the mounting leg portions at first bent portions on the back side of the door portion near the mounting holes. Second bent portions where the mounting leg portions are bent nearer their ends than the first bent portions are individually arranged. Further, the mounting leg portions at the second bent portions are covered with cover portions, which have a compatibility with the material forming the airbag cover and to which are melted/solidified together.

With this construction, the mounting leg portions of the ornament do not interfere with the airbag when expanding, so that they do not damage the airbag. This is because the mounting leg portions of the ornament at the second bent portions are covered with the cover portions. Moreover, the cover portions suppress the twisting of the second bent portions thereby to improve the mounting strength of the ornament when the door portion of the airbag cover is opened.

In case an inflator to be used for feeding the airbag with an inflating gas has a high output, however, a strong force acts on the door portion when the door portion of the airbag cover is to be pushed and opened by the airbag being inflated. This makes it necessary to enhance the strength of the mounting leg portions of the ornament on the airbag cover to a higher level.

SUMMARY OF THE INVENTION

An object of the present invention is to provide an airbag cover having an ornament which can be firmly mounted on the airbag cover.

The object of the invention can be achieved by the airbag cover having the ornament of the following construction.

The airbag cover is made of a synthetic resin and has a door portion adapted to cover a folded airbag and opened when the airbag is expanded and inflated;

the ornament includes an ornamental portion arranged on the surface side of the door portion of the airbag cover, and a plurality of mounting leg portions extended downward from the ornamental portion;

the ornament is mounted on the door portion by inserting the mounting leg portions individually into mounting holes formed in the door portion and by bending the mounting leg portions at first bent portions near the mounting holes on the back side of the door portion;

second bent portions for bending the leading end sides of the mounting leg portions are individually provided with the leading ends of the bent portion on the back side of the door portion of the mounting leg portions;

the mounting leg portions are covered near their leading ends with cover portions having a compatibility with the material forming the airbag cover and to which they are melted/solidified together; and the leading ends, as bent by the second bent portions, of the mounting leg portions are so covered in their vicinities with cover portions as to prevent the mounting leg portions from being extracted along the axial direction between the first bent portions and the second bent portions.

In the airbag cover having the ornament of the aforementioned construction, even if a strong force acts on the door portion at the time of expanding/inflating the airbag so that there is sufficient force to extract the individual mounting leg portions from the mounting holes by straightening them, the leading end portions of the individual mounting leg portions bent by the second bent portions are not readily extracted from the cover portions. This is because the leading end portions of the individual mounting leg portions bent by the second bent portions are so covered with the cover portions that they may be restrained from moving in the extracting direction generally along the axes of the individual mounting leg portions between the first bent portions and the second bent portions. In other words, the extractions of the individual mounting leg portions from the sides of their leading end portions are restrained by the cover portions so that the individual mounting leg portions can be prevented as a whole from being deformed or moved and so come out of the airbag cover. As a result, it is possible to improve the strength of the mounting of the ornament on the airbag cover.

In the invention, therefore, it is possible to provide the airbag cover having an ornament which can be firmly mounted on the airbag cover.

In the airbag cover having the ornament of the aforementioned construction, it is preferable that there are fragile portions near the second bent portions, where the bending operations begin.

With the aforementioned construction of the airbag cover having the ornament, the mounting leg portions are easily bent at the second bent portions. Moreover, the leading end portions can be made substantially constant in their length from the second bent portions to the leading ends. Specifically, the length of the leading end portions of the individual mounting leg portions to be arranged not to come out of the cover portions can be easily retained constant. Therefore, the ornament can be mounted with a stable mounting strength on the airbag cover.

In the airbag cover having the ornament of the aforementioned construction, moreover, it is preferable:

that downward protruding abutment portions are so individually arranged near the leading ends of the mounting leg portions on the back side of the door portion that they may be able to abut against and support only the vicinities of the leading ends of the mounting leg portions when the first bent portions are bent while the second bent portions are not bent; and that the second bent portions are formed by being pushed and bent toward the door portion with the vicinities of the leading ends of the mounting leg portions held in contact with the above abutment portions.

With the aforementioned construction of the airbag cover having the ornament, in the state where the above abutment portions are made to abut against the leading end portions of the individual mounting leg portions, the individual mounting leg portions are pushed at the locations for the second bent portions toward the door portion by means of the tool, so that the second bent portions can be formed. Therefore, it is possible to improve the working efficiency for mounting the ornament.

In the airbag cover having the ornament of the aforementioned construction, still moreover, it is preferable that portions scheduled to be melted/solidified and capable of covering, when melted, the vicinities of the leading ends of the mounting leg portions thereby to form the cover portions are individually arranged at portions on the back side of the door portion and near the second bent portions.

With the aforementioned construction of the airbag cover having the ornament, the individual mounting leg portions can be easily covered at their vicinities of the leading ends by melting/solidifying the designated portions which have been arranged in advance at the planned locations on the back side of the door near where the second bent portions are to be formed. Therefore, the material for the cover portions need not be separately prepared so that the covering efficiency is improved.

In the airbag cover having the ornament of the aforementioned construction, still moreover, it is preferable:

that downward protrusions are individually arranged at portions at the periphery of the mounting holes on the side of the abutment portions; and that the protrusions can abut against and support the mounting leg portions at the vicinities of the first bent portions when the first bent portions are bent while the second bent portions are not bent.

With the aforementioned construction of the airbag cover having the ornament, the second bent portions of the individual mounting leg portions are arranged in the recessed portions, which are enclosed by the abutment portions and the protrusions. Specifically, the second bent portions of the individual mounting leg portions are pushed by the tool into the recessed portions while the protrusions are made to contact with the individual mounting leg portions at the first folding portions and while the abutment portions are made to contact with the leading end portions of the individual mounting leg portions. Then, the second bent portions can be formed. At this time, both the bending angle of the first bent portions and the bending angle of the second bent portions can be made acute. Even if the spring-back occurs at the first bent portions and the second bent portions of the individual mounting leg portions after the second bent portions are formed, therefore, the angularly deep bent states at the second bent portions can be kept. As a result, the mounting strength of the ornament on the airbag cover can be better improved.

In the airbag cover having the ornament of the aforementioned construction, still moreover, it is preferable:

that the portions of the mounting leg portions bent to the back side of the door portion, are individually enclosed by peripheral wall portions protruding from the back side of the door portion; and that the peripheral wall portions are set to have such a height size as not to protrude from the mounting leg portions.

With the aforementioned construction of the airbag cover having the ornament, there is no danger that the mounting leg portions interfere with the airbag, and when the airbag is expanded there is no danger that the airbag will be damaged by the mounting leg portions.

In the airbag cover having the ornament of the aforementioned construction, still moreover, if the abutment portions are made to comprise portions of the peripheral wall portions near the leading ends of the mounting leg portions, the abutment portions need not be separately provided.

In the airbag cover having the ornament of the aforementioned construction, still moreover, it is preferable that portions to be melted/solidified so as to cover the vicinities of the leading ends of the mounting leg portions and so form the cover portions are individually provided at portions of the peripheral wall portions near the second bent portions.

In the airbag cover having the ornament of the aforementioned construction, the melting/solidification portions are arranged near the second bent portions in the peripheral wall portions, i.e., near the abutment portions. Even if the abutment portions are flawed or develop surface irregularities when the second bent portions are formed, therefore, not only the vicinities of the leading end portions but also the surfaces of the abutment portions can be covered when the cover portions are formed. As a result, even if the abutment portions locally interfere with the airbag being expanded and inflated, the airbag is hardly damaged by the abutment portions.

DESCRIPTION OF THE PREFERRED EMBODIMENTS

Figure 1:
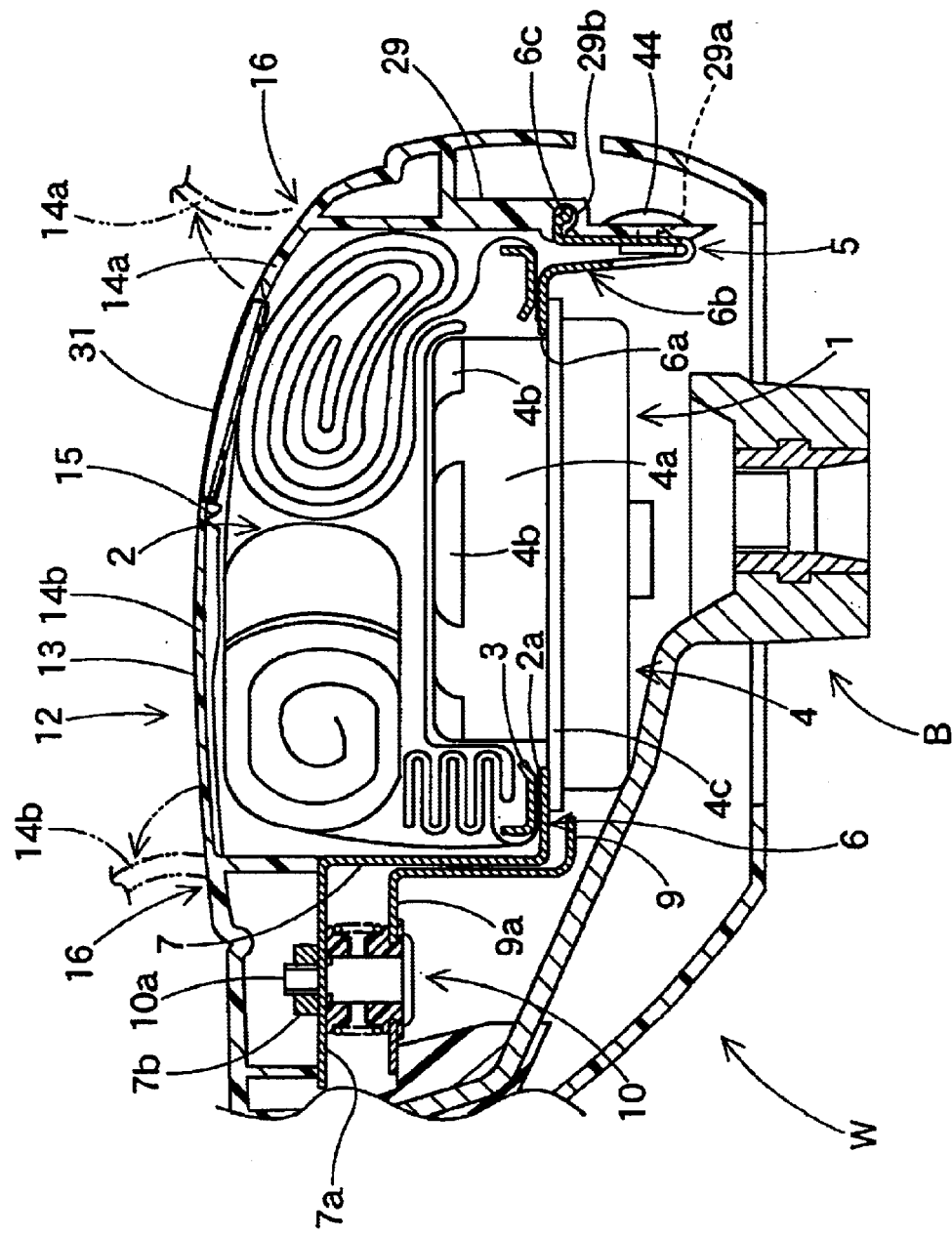
FIG. 1 is a sectional view showing a packed airbag cover having an ornament according to one embodiment of the invention, and corresponds to portion I—I of FIG. 2.

The invention will be described below by way of embodiments shown in the drawings. In addition, the invention is not limited to the embodiments. All modifications within the requirements of the claims and equivalents with respect to the requirements should be included in the scope of the claims.

One embodiment of the invention will be described with reference to the accompanying drawings.

Figure 2:
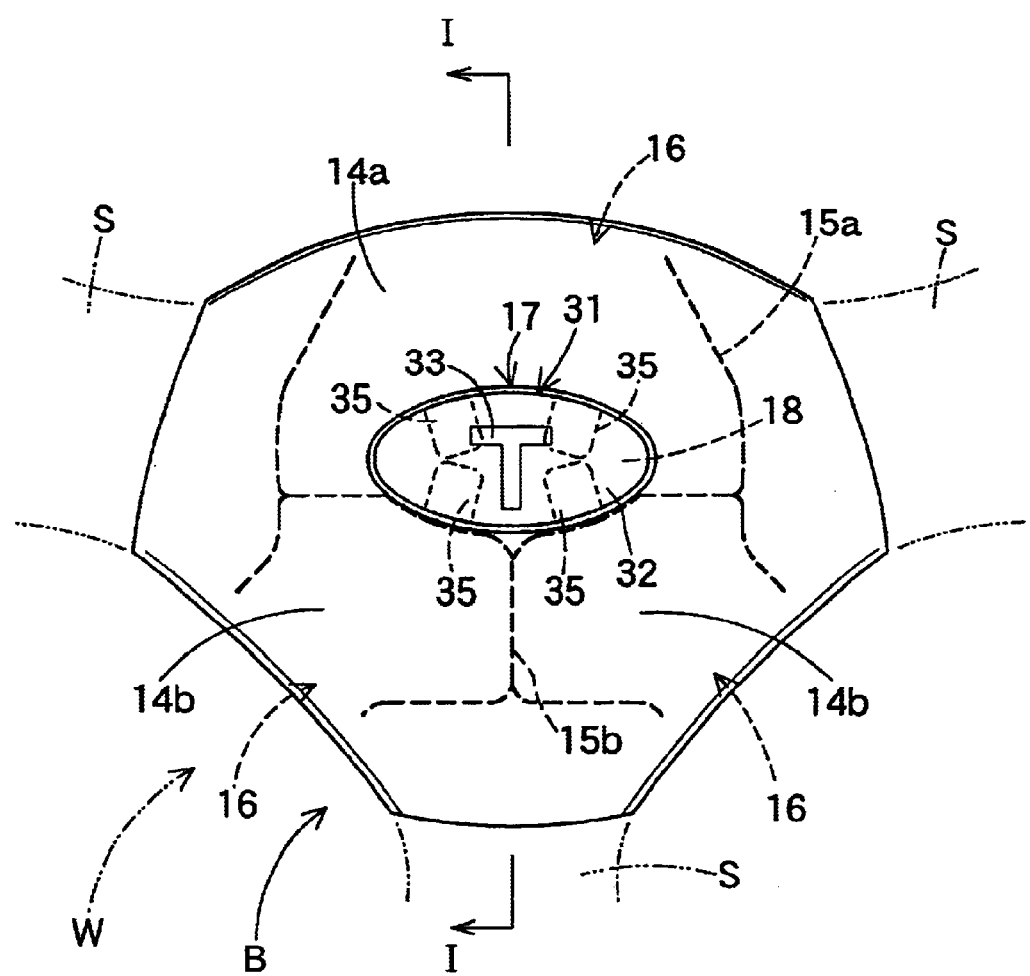
FIG. 2 is a top plan view of the airbag cover having the ornament of the same embodiment.

As shown in FIG. 1 and FIG. 2, an airbag cover 12 of the embodiment provided with an ornament 31 is used in an airbag device 1, which is arranged over a boss portion B at the center of a three-spoke type steering wheel W. The airbag device 1 is provided with an airbag 2 housed in a folded state, an inflator 4 for feeding an expanding gas to the airbag 2, a bag holder 5 for holding the airbag 2, the inflator 4 and the airbag cover 12, and a support plate 9. The airbag device 1 is supported by the support plate 9. Further, the horn switch mechanism 10 is arranged between the airbag device 1 and the support plate 9.

The airbag 2 is formed into a bag shape having an opening 2a in its lower portion. The inflator 4 is provided with a generally cylindrical body 4a, and a flange portion 4c protruding from the outer circumference of the body 4a. Gas discharge ports 4b are arranged in the upper portion of the body 4a.

The bag holder 5 is provided with a bottom wall portion 6, and side wall portions 7 extended upward from the outer peripheral edge of the bottom wall portion 6. In the center of the bottom wall portion 6, there is arranged an insertion hole 6a for inserting the inflator body 4a upward. The side wall portions 7 are individually formed at three portions near the portion in which spoke portions S (FIG. 2) are arranged. On the front edge side of the bottom wall portion 6, there are formed connecting portions 6b, which are extended downward and turned upward. At the leading ends of the connecting portions 6b, there are formed retaining pawls 6c, which are turned downward. These connecting portions 6b are individually formed at the portions in which the spoke portions S are not arranged, that is, in front of and on the right and left of the rear of the steering wheel W. Then, the airbag cover 12 is mounted on the bag holder 5 in the following manner. Each connecting portion 6b restrains the retaining groove 29b in the side wall portion 29 of the airbag cover 12 with the retaining pawl 6c. Moreover, the sidewalk portions 29 are riveted to the individual connecting portions 6b with rivets 44.

The individual side wall portions 7 of the bag holder 5 are extended upward from the bottom wall portion 6. At the upper edge of each side wall portion 7, moreover, there is arranged a mounting portion 7a, which is extended outward. Each mounting portion 7a has a nut 7b fixed thereon. Further, the side wall portion 7 is connected and supported via the horn switch mechanism 10 to a supporting portion 9a of the support plate 9 by means of a stepped bolt 10a of the horn switch mechanism 10 screwed in the nut 7b.

The airbag 2 and the inflator 4 are mounted in the bag holder 5 in the following manner. First of all, the not-shown bolts, which are arranged to protrude downward from an annular retainer 3 arranged on the periphery of the opening 2a of the airbag 2, are inserted through the peripheral edge of the airbag opening 2a, the periphery of the insertion hole 6a in the bottom wall portion 6 of the bag holder 5, and the flange portion 4c of the inflator 4. Then, these bolts are fastened by nuts on the lower face side of the flange portion 4c, and thus the airbag 2 and the inflator 4 are mounted in the bag holder 5.

The airbag cover 12 is made of a thermoplastic elastomer such as polyolefin or styrene. This airbag cover 12 is provided with a ceiling wall portion 13 for covering the airbag 2 when folded, and side wall portion 29 protruding downward from the lower face of the ceiling wall portion 13. The side wall portion 29 is formed into a generally triangular tube shape.

At predetermined positions of the side wall portion 29, there are formed a plurality of mounting holes 29a for fixing the cover 12 on the connecting portion 6b of the bag holder 5 by means of the rivets 44.

The ceiling wall portion 13 is provided with a door portion 14, a breakaway portion 15 arranged around the door portion 14 which is easily broken, and a hinge portion 16 for acting as a hinge when the door portion 14 is opened. As shown in FIG. 2, the door portion 14 comprises a larger door portion 14a positioned toward the front of the vehicle, and two smaller door portions 14b and 14b positioned toward the rear of the vehicle, to the right and left sides. Further, the generally elliptical ornament 31 is arranged on the larger door portion 14a near the center of the rear boundary of the larger door portion 14a. The breakaway portion 15 is arranged around the door portions 14a and 14b. This breakaway portion 15 is arranged to curve around the mounting portion 17 for mounting the ornament 31. In the case of the embodiment, as shown in FIG. 2, the breakaway portion 15 is formed into a shape, in which a general U-shape and a general inverted T-shape, as taken in the top plan view, are joined to each other with the two aligned in the longitudinal direction of the vehicle. When the U-shape portion 15a in the breakaway portion 15 is broken, the larger door portion 14a is opened toward the front of the vehicle. When the U-shape portion 15a and the inverted T-shape portion 15b in the breakaway portion 15 are broken, moreover, the smaller door portions 14b and 14b are individually opened obliquely, between the transverse and rear directions. In the case of the embodiment, the hinge portion 16 at the time when the individual door portions 14 (i.e., 14a and 14b) are opened is located near each of the side wall portions 29 (FIG. 1).

Figure 3:
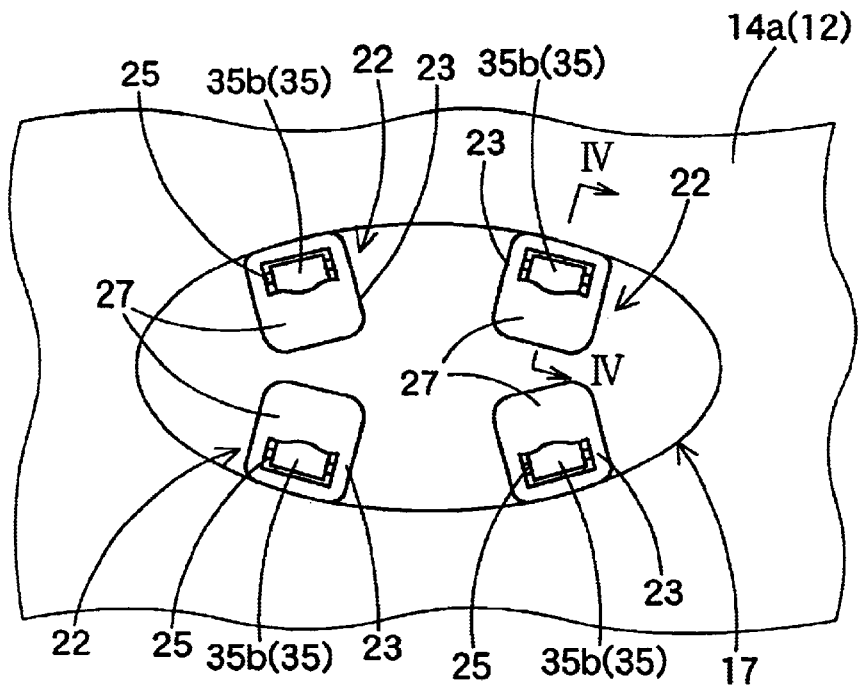
FIG. 3 is a partially enlarged bottom view of the vicinity of the ornament mounting portion in an airbag cover having the ornament of the same embodiment.
Figure 4:
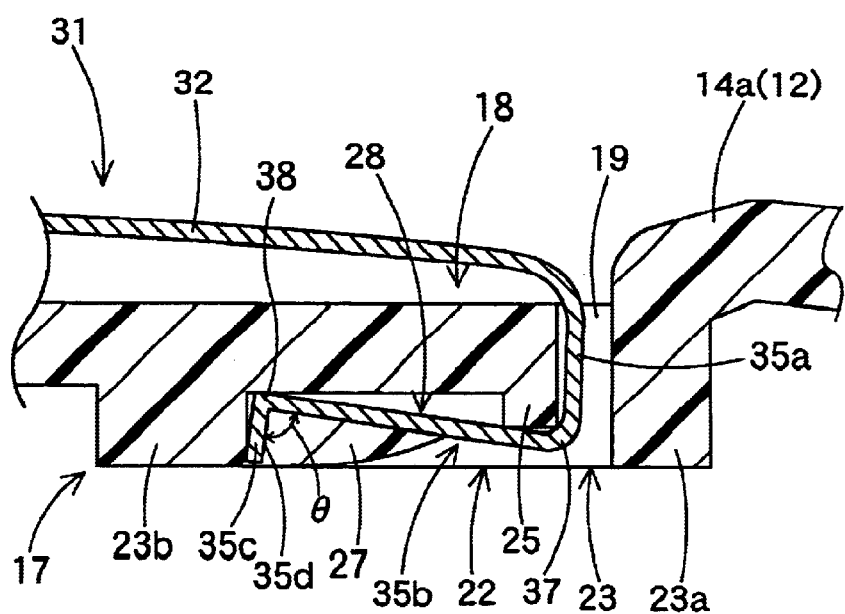
FIG. 4 is an enlarged sectional view of portion IV—IV of FIG. 3.

As shown in FIG. 3 and FIG. 4, the mounting portion 17 for mounting the ornament 31 is provided with a housing recess 18, four mounting holes 19, and four fixing portions 22 for fixing four mounting leg portions 35 individually. The housing recess 18 is a portion for housing the later-described ornamental portion 32 of the ornament 31. The mounting holes 19 are portions for inserting the four mounting leg portions 35 of the ornament 31 individually. The individual fixing portions 22 are formed on the rear of the larger door portion 14a.

The housing recess 18 is constructed to house the generally elliptical ornamental portion 32. Specifically, the housing recess 18 is formed by recessing the surface of the larger door portion 14 in a generally elliptical shape. In the case of the embodiment, the mounting portion 17 is formed so that the portion forming the housing recess 18 is made substantially as thick as the larger door portion 14a. Specifically, the portion of the mounting portion 17 forming the housing recess 18 is protruded to the rear of the larger door portion 14a (FIG. 4). Each fixing portion 22 is arranged on the rear of the housing recess 18. Each mounting hole 19 is arranged to extend through the front surface to the rear at the peripheral edge of the housing recess 18 so that it may communicate with each fixing portion 22. In the case of the embodiment, each mounting hole 19 is opened in a generally rectangular shape so that each mounting leg portion 35 can be inserted.

Figure 5:
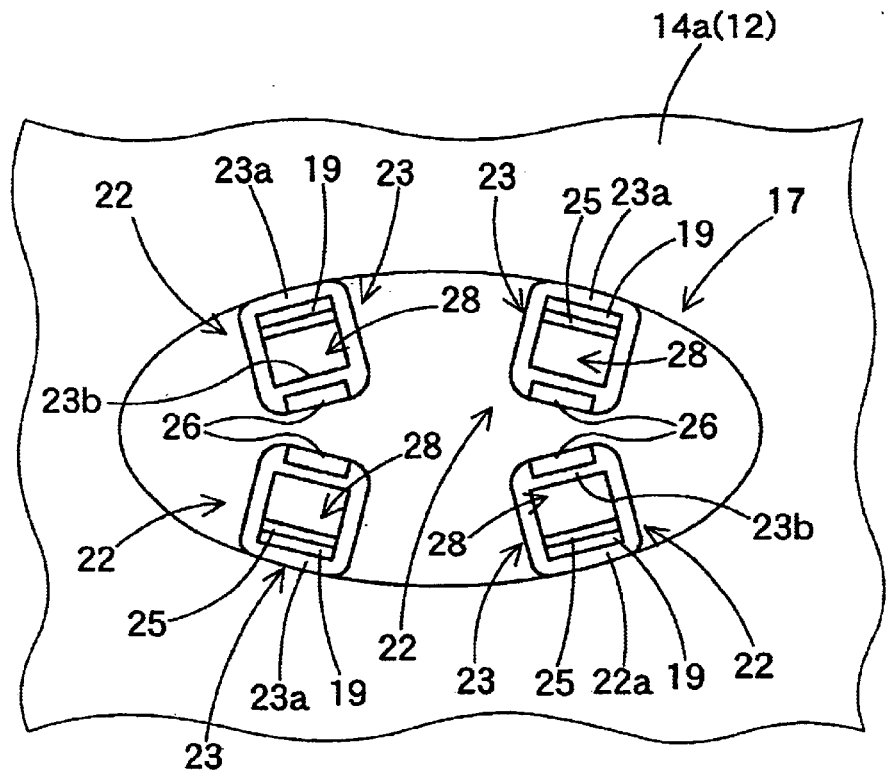
FIG. 5 is a partially enlarged bottom view of the vicinity of the ornament mounting portion of the airbag cover used in the same embodiment, and shows the state before the ornament is mounted.
Figure 6:
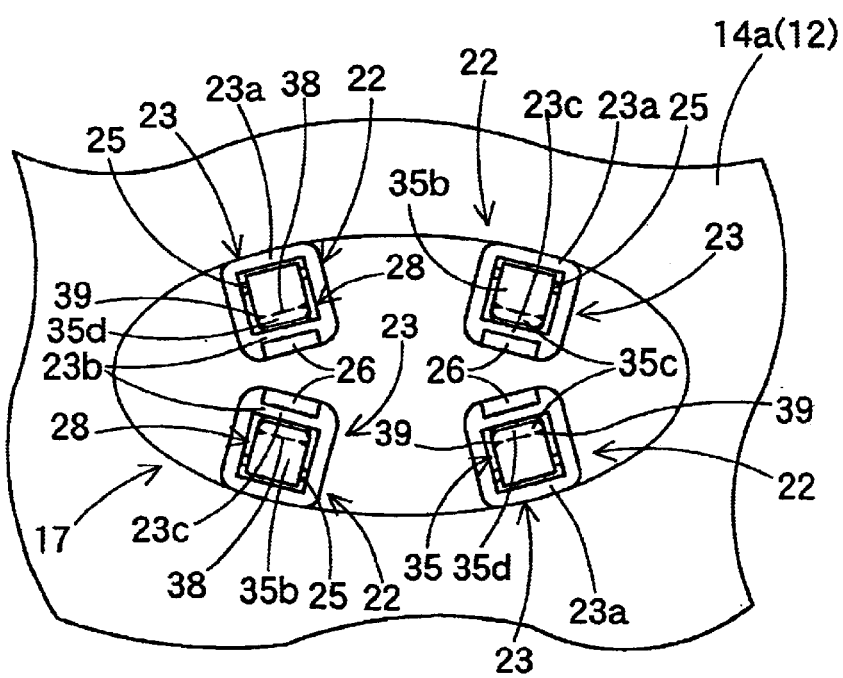
FIG. 6 is a partially enlarged bottom view of the portion near the ornament mounting portion of the airbag cover used in the same embodiment, and shows the state before a cover portion is molded.

Each fixing portion 22 is provided with a peripheral wall portion 23 for enclosing the intermediate portion 35b and the leading end portion 35c, as will be described hereinafter, of each mounting leg portion 35 when the ornament 31 is mounted. As shown in FIG. 5 and FIG. 6, the peripheral wall portion 23 is formed into a generally square cylinder shape protruding downward. This peripheral wall portion 23 is set to have such a height size that the mounting leg portion 35 will not protrude from its lower end when the ornament 31 is mounted. Each mounting hole 19 is arranged adjacent to an outer peripheral side wall portion 23a of the peripheral wall portion 23 of each fixing portion 22. And, a downward protruding portion 25 is arranged to extend along the inner peripheral side of the mounting hole 19 in each fixing portion 22. Also, a portion enclosed by the protruding portion 25 and the peripheral wall portion 23, is a recessed portion 28 for holding the later-described second bent portion 38 of each mounting leg portion 35. This protruding portion 25 provides a fulcrum at the time when the later-described first bent portion 37 in each mounting leg portion 35 of the ornament 31 is bent in the operation to mount the ornament 31. Moreover, the protruding portion 25 supports the mounting leg 35 in the vicinity of the first bent portion 37 when the later-described second bent portion 38 in each mounting leg portion 35 of the ornament 31 is bent.

At the inner peripheral side wall portion 23b in the peripheral wall portion 23, on the other hand, there is formed a melting/solidification portion 26 protruded downwards, as shown in FIG. 5 and FIG. 6. This melting/solidification portion 26 is close to the center of the mounting portion 17. Here, FIG. 5 is a bottom view of the mounting portions before the ornament 31 is mounted thereon. FIG. 6 is a bottom view in which the ornament 31 is mounted on the mounting portion 17 but before cover portion 27 is formed. That melting/solidification portion 26 is melted to form the cover portion 27, as shown in FIG. 3 and FIG. 4, when the ornament 31 is mounted. This cover portion 27 is formed to fill up the clearance between the peripheral wall portion 23 and the mounting leg portion 35, as shown in FIG. 3 and FIG. 4. In the case of the embodiment, the cover portion 27 is formed to cover not only the leading end portion 35c of the mounting leg portion 35 but also half of the leading end side of the intermediate portion 35b. Moreover, the inner peripheral side wall portion 23b (especially, its edge portion 23c on one side of the mounting hole 19) of the peripheral wall portion 23 is a portion (or an abutment) for abutting against and supporting the leading end portion 35c of each mounting leg portion 35 when the first bent portion 37 is bent while the second bent portion 38 is not bent, during mounting of the ornament 31.

The ornament 31 is provided with the generally elliptical ornamental portion 32, and the four mounting leg portions 35 extended downward from the outer peripheral edge of the ornamental portion 32. The ornamental portion 32 is arranged on the surface side of the larger door portion 14a so as to be housed in the housing recess 18. Each mounting leg portion 35 is inserted through each mounting hole 19 and is bent on the rear of the door portion 14a. The ornamental portion 32 is provided with an ornamental body portion 33 for expressing letters, patterns and so on, as viewed in the top plan view.

Figure 7:
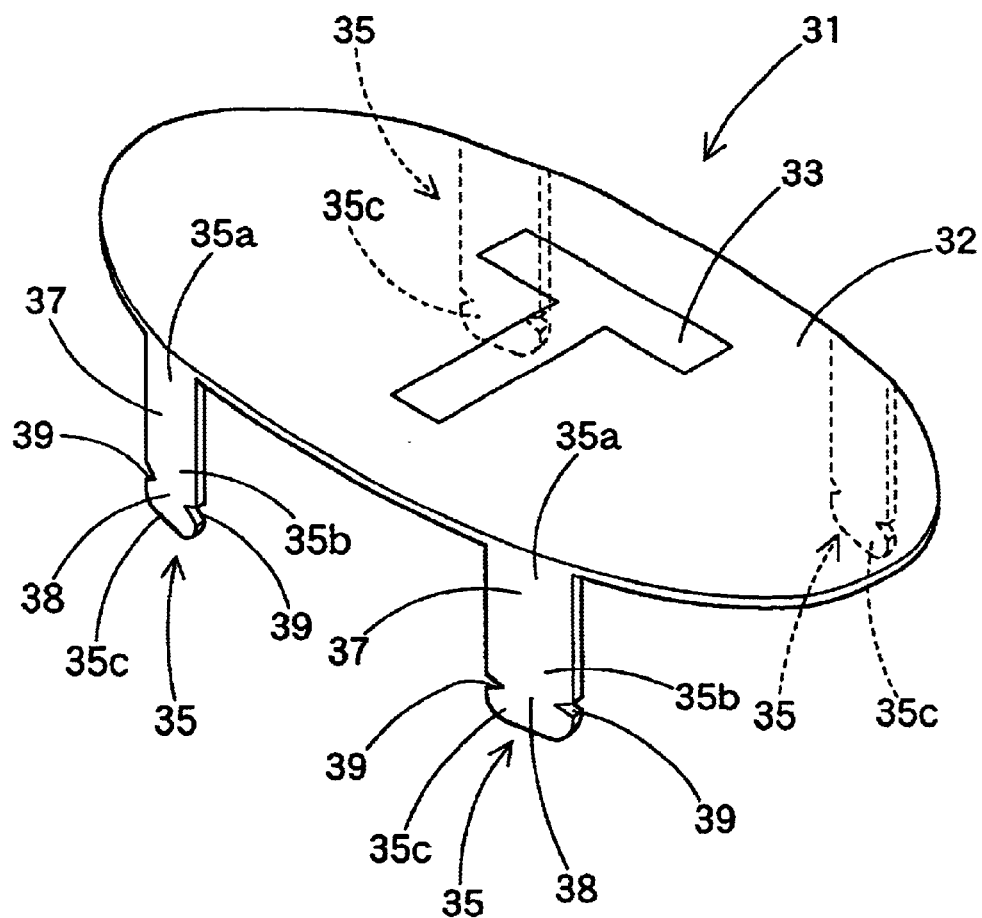
FIG. 7 is a perspective view of the ornament used in the same embodiment.

As shown in FIG. 4, FIG. 6 and FIG. 7, each mounting leg portion 35 is provided with a through portion 35a, an intermediate portion 35b and a leading end portion 35c in order toward the tip of the leg. The through portion 35a is the portion to go through the mounting hole 19. The intermediate portion 35b is a portion to be bent toward the center on the rear of the door portion 14a. The leading end portion 35c is the portion to be bent downward. In each mounting leg portion 35 of the embodiment, specifically, the first bent portion 37 is bent at the boundary of the through portion 35a and the intermediate portion 35b. At the boundary of the intermediate portion 35b and the leading end portion 35c, on the other hand, there is formed the second bent portion 38. Cut-away portions 39 and 39 are cut out to make the second bent portion 38 fragile. These cut-away portions 39 and 39 are formed by cutting at the two widthwise edges of each mounting leg portion 35 generally in a wedge shape. These cut-away portions 39 are the starting points for the bending operation so that the leading end portion 35c may be easily bent with respect to the intermediate portion 35b. Moreover, the cut-away portions 39 are portions for positioning the second bent portion 38. Here, FIG. 7 shows the ornament 31 before the state in which it is mounted on the airbag cover 12. Each mounting leg portion 35 is formed, before mounting, to have its through portion 35a, the intermediate portion 35b and the leading end portion 35c all along one line. Each mounting leg portion 35 is bent individually at the first bent portion 37 and at the second bent portion 38 when the ornament 31 is mounted. Here, the first bent portion 37 is positioned near the protruding portion 25 comprising one edge of the mounting hole 19, as shown in FIG. 4, when the ornament 31 is mounted on the airbag cover 12.

When the ornament 31 is mounted on the airbag cover 12, as shown in FIG. 4, each leading end portion 35c is made to point downward by bending the second bent portion 38. Moreover, the second bent portion 38 is arranged in the recessed portion 28 (FIG. 4). This leading end portion 35c is bent such that the angle θ between the intermediate portion 35b and the leading end portion 35c is not more than 90 degrees (FIG. 4). In other words, the second bent portion 38 is formed to have an acute bent angle θ. When the ornament 31 is mounted on the airbag cover 12, the first bent portion 37 also is formed to have an acute bent angle (FIG. 4).

Further, each leading end portion 35c is covered on its face 35d (or undercut portion) facing toward the first bent portion 37 with the cover portion 27 so that leading end portion 35c may be restrained from moving in the direction in which the mounting leg portion 35 is extracted along the axis of the intermediate portion 35b, the portion of the mounting leg portion 35 between the first bent portion 37 and the second bent portion 38. In the case of the embodiment, as shown in FIG. 3 and FIG. 4, the cover portion 27 covers the face 35d of the leading end portion 35c facing toward the first bent portion 37 up to the part of the intermediate portion 35b adjoining the leading end portion 35c.

Here, this ornament 31 is formed by a pressing treatment such as by punching or drawing a sheet of metal material such as aluminum or stainless steel (e.g., an aluminum sheet having a thickness of about 0.5 mm in the embodiment).

Figure 8A:
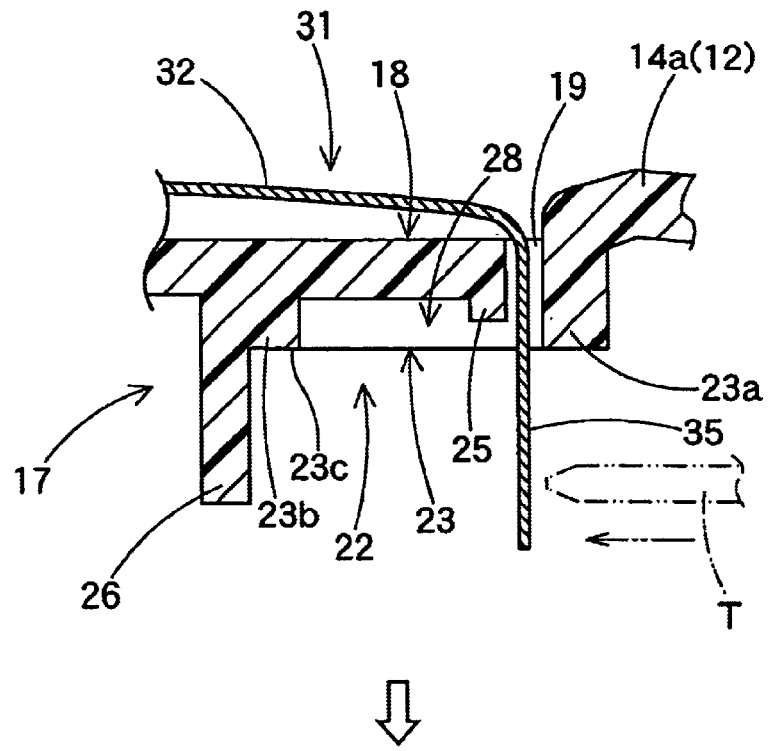
FIG. 8A and FIG. 8B are schematic sections showing a step of mounting the ornament on the airbag cover in the same embodiment.
Figure 8B:
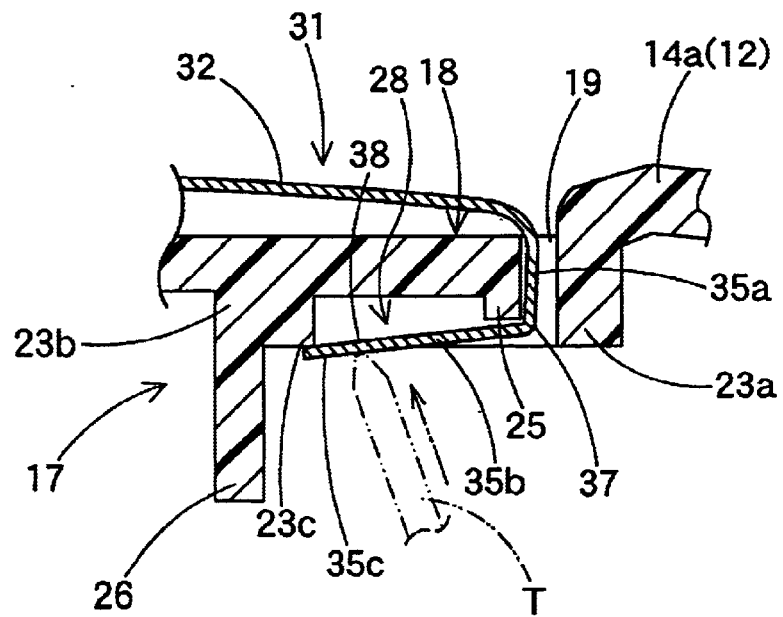

Here will be described how to mount the ornament 31 on the airbag cover 12. First of all, as shown in FIG. 8A, the ornamental portion 32 is housed in the housing recess 18 so that the individual mounting leg portions 35 of the ornament 31 are inserted into the individual mounting holes 19. Next, as shown in FIG. 8B, a tool T is used to bend the individual mounting leg portions 35 at the first bent portions 37 near the protruding portions 25 so that the intermediate portions 35b are directed toward the center. At this time, the leading ends of the leading end portions 35c abut against and are supported by the inner peripheral side wall portions (or the abutments) 23b (or 23c) in the peripheral wall portions 23. On the other hand, the portions near the first bent portions 37 abut against and are supported by the protrusions 25.

Figure 9A:
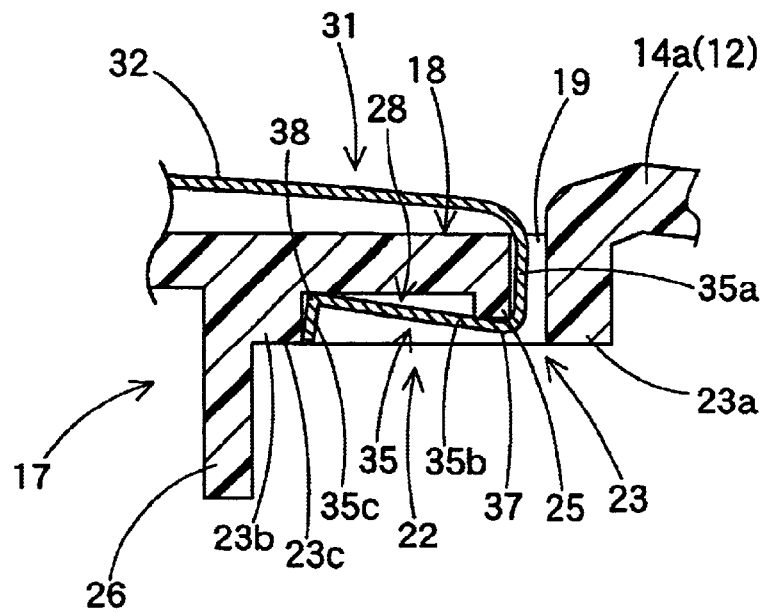
FIG. 9A and FIG. 9B are schematic sections showing the step of mounting the ornament on the airbag cover in the same embodiment after FIG. 8A and FIG. 8B.
Figure 9A:
Figure 9B:
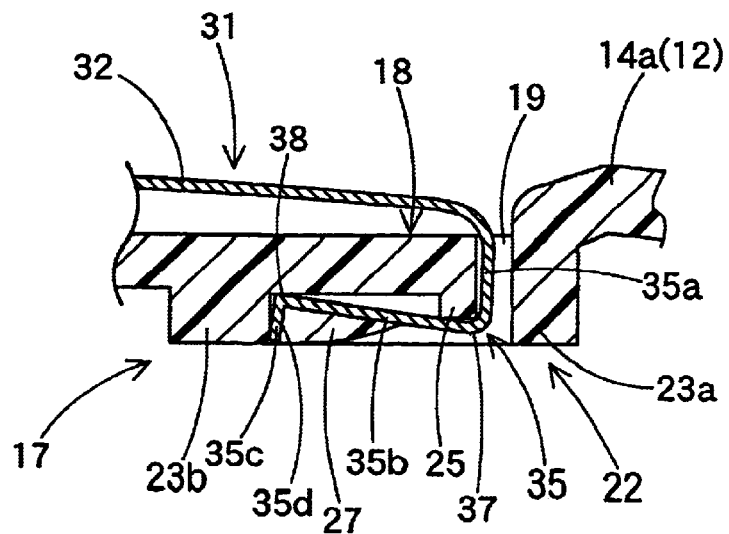

After this, as shown in FIG. 9A, the tool T is used to push and bend the individual mounting leg portions 35 locally at the second bent portions 38 toward the door portion 14a (or the recessed portion 28) so that the leading end sides of the leading end portions 35c point downward. At the same time, the second bent portions 38 enter the recessed portion 28. At this time, the intermediate portions 35b are supported on their root sides by the protruding portions 25, and the leading end portions 35c are supported on their sides facing the center by the inner peripheral side wall portions 23b. Therefore, the second bent portions 38 can be easily bent merely by pushing them with the tool T. Moreover, the second bent portions 38 are pushed into the recessed portion 28 so that both the bending angle of the first bent portions 37 and the bending angle θ of the second bent portions 38 are acute. As shown in FIG. 9B, moreover, the melting/solidification portions 26 to be arranged in the inner peripheral side wall portions 23b are melted by heating. After this, the portions 26 melted are cooled and solidified to form the cover portions 27 covering the rear facing sides of the leading end portions 35c up to the parts of the intermediate portions 35b close to the leading end portions 35c. Thus, the ornament 31 is completely mounted and fixed on the airbag cover 12.

Here will be described how to assemble the airbag device 1. First of all, the airbag 2 is folded with the retainer 3 being arranged therein. Then, the inflator body 4a is inserted upward into the insertion hole 6a in the bottom wall portion 6 of the bag holder 5. Then, the not-shown bolts of the retainer 3 are inserted into the bottom wall portion 6 of the bag holder 5 and into the flange portion 4c of the inflator 4 and are fastened with the nuts. After this, the folded airbag 2 is covered with the airbag cover 12 having the ornament 31 mounted and fixed thereon. The retaining pawls 6c are inserted into the retaining grooves 29b, and the side wall portions 29 are riveted to the connecting portions 6b in the bottom wall portion 6 of the bag holder 5 by the rivets 44. Then, the stepped bolts 10a of the horn switch mechanism 10 set in the support plate 9 are screwed in the nut 7b arranged in the mounting portion 7a of the side wall portion 7 of the bag holder 5 so that the supporting portions 9a of the support plate 9 is connected to the individual mounting portion 7a. Thus, the assembly of the airbag device 1 is completed.

If the inflating gas is discharged from the gas discharge ports 4b of the inflator 4 after the steering wheel W having the airbag device 1 of the aforementioned construction mounted and fixed therein was mounted on the vehicle, the airbag 2 being inflated breaks the breakaway portion 15. Then, the airbag 2 pushes open the door portions 14 (i.e., 14a and 14b) so that it protrudes from the ceiling wall portion 13 and greatly expands.

In the airbag cover 12 of the embodiment provided with the ornament 31, moreover, the leading end portions 35c bent at the second bent portions 38 of the individual mounting leg portion 35 are covered with the cover portions 27 so that they are restrained from moving in the direction along which the individual mounting leg portion 35 is extracted, generally along the axis of the intermediate portions 35b of the individual mounting leg portions 35 between the first bent portions 37 and the second bent portions 38. Even if a strong force acts on the door portion 14a at the time of expanding the airbag 2 to straighten the individual mounting leg portions 35 and extract the individual mounting leg portions 35 from the mounting holes, therefore, the leading end portions 35c of the individual mounting leg portions 35, being bent at the second bent portions 38, are difficult to extract from the cover portions 27. This is because the sides 35d facing first bent portions 37 of the leading end portions 35c of the individual mounting leg portions 35, that is, the undercut portions, are covered with the cover portions 27. In other words, in the embodiment, the extraction of the individual mounting leg portions 35 starting from their leading end portions 35c is restrained by the cover portions 27 so that the individual mounting leg portions 35 can be prevented as a whole from being deformed or removed from the airbag cover 12. As a result, it is possible to improve the strength of mounting of the ornament 31 on the airbag cover 12.

In the embodiment, therefore, it is possible to provide the airbag cover 12 with the ornament 31, which can be firmly mounted on the airbag cover 12.

In the case of the embodiment, moreover, the leading end portions 35c of the individual mounting leg portions 35 are covered on their rear facing sides with the cover portions 27. Therefore, the movement of the leading end portions 35c of the individual mounting leg portions 35 away from the rear of the door portion 14a is also suppressed by the cover portions 27.

In the airbag cover 12 of the embodiment having the ornament 31, moreover, each second bent portion 38 is provided with the cut-away portions 39 and 39 making this portion fragile as is suitable for the bending operation. Therefore, the mounting leg portions 35 are easily bent at the second bent portions 38. In the embodiment, moreover, the leading end portions 35c can be made substantially constant in their length size. Specifically, the length size of the leading end portions of the individual mounting leg portions 35 to be arranged not to come out of the cover portions 27 can be easily retained constant. Therefore, the ornament 31 can be mounted with a stable mounting strength on the airbag cover 12.

Here, the shape of the cuts to be made in the second bent portions 38 should not be limited to that of the cut-away portions 39 of the embodiment. For example, cuts may also be intermittently formed in the second bent portions. Moreover, the fragile portions may also be formed by thinning the second bent portions.

In the airbag cover 12 of the embodiment having the ornament 31, moreover, near the leading end portions 35c of the individual mounting leg portions 35 on the back side of the door portion 14a, there are arranged the inner peripheral side wall portions 23b (or 23c) acting as the abutment portion, which can support in abutment the leading end portions 35a of the individual mounting leg portions 35 at the time when the first bent portions 37 are bent while the second bent portions 38 are not bent. Further, in the state where the leading end portions 35a of the individual mounting leg portions 35 abut against the individual inner peripheral side wall portions 23b (or 23c), the second bent portions 38 in the individual mounting leg portions 35 are pushed toward the door portion 14a by means of the tool T, so that the second bent portions 38 can be formed. As a result, it is possible to improve the working efficiency for mounting the ornament 31.

Figure 10:
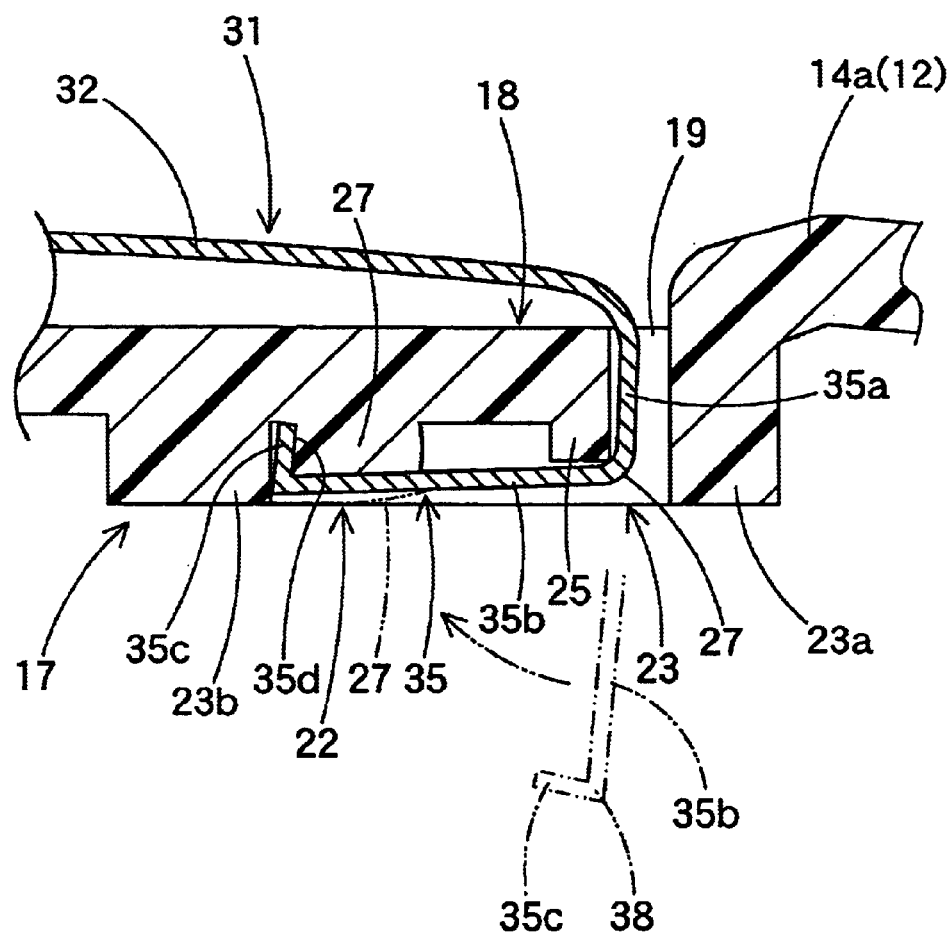
FIG. 10 is a partially enlarged sectional view showing another embodiment of the invention.

If this point is not considered significant, it is acceptable that no abutment portion is arranged on the side of the airbag cover 12. Moreover, the bent shape of the mounting leg portions should not be limited to the aforementioned one. In the individual mounting leg portions 35 of the embodiment, specifically, the second bent portions 38 are bent such that the leading end sides of the leading end portions 35c point toward the rear. As shown in FIG. 10, however, the individual mounting leg portions 35 may also be constructed so that when mounting the ornament 31 the second bent portions 38 are bent to point the leading end portions 35c upward. At this time, the mounting leg portions 35 are mounted, as indicated by double-dotted lines in FIG. 10, by bending the second bent portions 38 in advance and then bending the first bent portions 37. In the case of this construction, too, the faces 35d (or the undercut portions) facing toward the first bent portions 37 when the leading end portions 35c are bent are covered with the cover portions 27, as shown in FIG. 10. With this construction, the leading end portions 35c are difficult to extract from the cover portions 27 so that the ornament 31 can be prevented as much as possible from coming out of the airbag cover 12. As indicated by a double-dotted line in FIG. 10, moreover, the construction may be made such that the lower face sides of the intermediate portions 35b are also covered with a cover portion. With this construction, an outturn of the leading end portions 35c of the individual mounting leg portions 35 from the door portion 14a can also be suppressed by the cover portion 27.

In the airbag cover 12 of the embodiment having the ornament 31, still moreover, the downward protruding portions 25 are arranged on the peripheral edges of the mounting holes 19 and constructed so that they can abut against and support the mounting leg portions 35 near the first bent portions 37. In the airbag cover 12 of the embodiment, the second bent portions 38 of the individual mounting leg portions 35 are arranged in the recessed portions 28, which are enclosed by the peripheral wall portions 23 (or the abutment portions 23b) and the protruding portions 25. Specifically, while the protruding portion 25 are made to contact with the first bent portions 37 of the individual mounting leg portions (i.e., the root sides of the intermediate portions 35b) and while the peripheral wall portions 23b are made to contact with the leading end portions 35c, the second bent portions 38 of the individual mounting leg portions 35 are pushed by the tool T into the recessed portions 28. In this way the second bent portions 38 can be formed. At this time, both the bending angle of the first bent portions 37 and the bending angle θ of the second bent portions 38 can be made acute. Even if spring-back occurs at the first bent portions 37 and the second bent portions 38 of the individual mounting leg portions 35 after the second bent portions 38 are formed, therefore, the angularly deep bent states at the second bent portions 38 can be kept. As a result, the mounting strength of the ornament 31 on the airbag cover 12 can be improved.

In the airbag cover 12 of the embodiment having the ornament 31, moreover, the melting/solidification portions 26 are individually arranged locally near the individual second bent portions 38 on the rear of the door portion 14a. By melting and solidifying those portions 26 arranged near the individual second bent portions 38 on the rear of the door portion 14a, therefore, the individual mounting leg portions 35 can be easily covered at their leading end portions 35c. Therefore, the material for the cover portions 27 need not be separately prepared so that the covering efficiency is improved. If this point is not considered significant, it is quite natural that the melting/solidification portions 26 are not formed integrally with the airbag cover 12. For example, after the ornament 31 is mounted, another member having a compatibility with the material of the airbag cover 12 may be fixed on the airbag cover 12 by a fusing treatment or the like, thereby forming the cover portions 27 near the leading end portions 35c of the individual mounting leg portions 35.

In the embodiment, moreover, the melting/solidification portions 26 are arranged near the inner peripheral side wall portions 23b serving as the abutment portions. Even if the inner peripheral side wall portions 23b are damaged or deformed when the second bent portions 38 are locally bent by abutting the leading end portions 35c of the individual mounting leg portions 35 against the inner peripheral side wall portions 23b, therefore, not only the surfaces of the vicinities of the leading end portions 35c but also the inner peripheral side wall portions 23b can be covered when the cover portions 27 are formed. As a result, even if the inner peripheral side wall portions 23b interfere with expansion of the airbag 2, there is no danger that the airbag 2 will be damaged by the inner peripheral side wall portions 23b. Here in the embodiment, the melting/solidification portions 26 are arranged on the inner peripheral side wall portions 23b in the peripheral wall portions 23. However, the positions at which the melting/solidification portions 26 are arranged can be other than the inner peripheral side wall portions 23b, as long as they are located near the second bent portions 38. For example, the melting/solidification portions 26 may be arranged near the second bent portions 38 of the wall portions, at a right angle to the inner peripheral side wall portions 23b of the peripheral wall portions 23.

In the embodiment, moreover, the vicinity of intermediate portions 35b and the leading end portions 35c in the individual mounting leg portions 35 of the ornament 31 is completely surrounded by the peripheral wall portions 23. Moreover, these peripheral wall portions 23 are set to such a height size as to prevent the mounting leg portions 35 from protruding from the lower ends of the peripheral wall portions 23. Even if the intermediate portions 35b of the mounting leg portions 35 are not covered with the cover portions 27 as in the embodiment, therefore, there is no danger that their edges will interfere with the airbag 2 when inflating. As a result, when the airbag 2 is inflated, there is no danger that it will be damaged by the mounting leg portions 35. Here in the embodiment, the cover portions 27 cover about one half of the inner peripheral side of the peripheral wall portions 23 (FIG. 3). The construction should not be limited to that but may be modified so that only the leading end portions 35c are covered with the cover portions 27. The construction may also be modified so that the intermediate portions 35b and the leading end portions 35c are almost completely covered with the cover portions 27.

Here, the embodiment has been described using as an example the construction in which the ornament 31 is mounted on the airbag cover 12 for the steering wheel W. However, the invention should not be limited thereto. For example, the invention can be applied to the airbag cover of an airbag device to be mounted in front of a passenger's seat, a door, a seat, an interior wall or the like, where an ornament is mounted on the airbag cover.

Moreover, the embodiment uses the ornament 31, the ornamental portion 32 of which is generally elliptical and provided with the four mounting leg portions 35. However, the shape of the ornamental portion and the number of mounting leg portions in the ornament should not be limited to those of the embodiment. Moreover, the bent directions of the mounting leg portions 35 in the ornament 31 are directed in the embodiment toward the center but may instead be directed to the outside.

What is claimed is:

1. An airbag cover made of a synthetic resin adapted to cover a folded airbag and provided with an ornament, and also provided with a door portion which opens when said airbag is inflated, wherein said ornament includes an ornamental portion arranged on the front surface of said door portion, and a plurality of mounting leg portions extended downward from said ornamental portion, wherein said ornament is mounted on said door portion by inserting said mounting leg portions individually into mounting holes formed in said door portion and by bending said mounting leg portions at first bent portions near the opening of said mounting holes on the rear side of said door portion, wherein second bent portions of said mounting leg portions are formed near the leading ends of said mounting leg portions on the rear side of said door portion, wherein said mounting leg portions are covered near their leading ends by melting and solidifying cover portions having compatibility with the material forming said airbag cover, and wherein the vicinity of leading ends of said mounting leg portions bent at said second bent portions is covered with said cover portions so that the leading ends are restrained from being extracted in the general direction of the axis of the portions of said mounting leg portions between said first bent portions and said second bent portions.

2. An airbag cover having an ornament according to claim 1, wherein portions of said second bent portions are made fragile to facilitate start of the bending operation.

3. An airbag cover having an ornament according to claim 1, wherein downward protruding abutment portions are arranged near the leading ends of said mounting leg portions on the rear side of said door portion so that the abutment portions may be able to support only the vicinities of the leading ends of said mounting leg portions which come in contact with the abutment portions when said first bent portions are bent while said second bent portions are not yet bent, and wherein said second bent portions are formed by pushing and bending this portion toward said door portion with the vicinity of the leading ends of said mounting leg portions still abutting against said abutment portions.

4. An airbag cover having an ornament according to claim 1, wherein the portions to be melted/solidified and so cover the vicinities of the leading ends of said mounting leg portions to form said cover portions are individually arranged at portions on the rear side of said door portion near said second bent portions.

5. An airbag cover having an ornament according to claim 3, wherein at portions on the peripheral edges of said mounting holes on the side of said abutment portions, downward protrusions are arranged, and wherein said protrusions can support the vicinities of said first bent portions of said mounting leg portions while said first bent portions are bent and while said second bent portions are not yet bent.

6. An airbag cover having an ornament according to claim 1, wherein the portions of said mounting leg portions bent on the rear side of said door portion are individually enclosed by peripheral wall portions protruding from the rear side of said door portion, and wherein said peripheral wall portions are set to have sufficient height that said mounting leg portions do not protrude.

7. An airbag cover having an ornament according to claim 3, wherein the portions of said mounting leg portions bent on the rear side of said door portion are individually enclosed by peripheral wall portions protruding from the back side of said door portion, wherein said peripheral wall portions are set to have sufficient height that said mounting leg portions do not protrude, and wherein the portions of said peripheral wall portions near the leading ends of said mounting leg portions are used as said abutment portions.

8. An airbag cover having an ornament according to claim 7, wherein melting/solidification portions capable of covering the vicinities of the leading ends of said mounting leg portions when melted and form said cover portions when hardened, are arranged at portions of said peripheral wall portions near said second bent portions.

* * * * *